(12) United States Patent
Huang et al.

(10) Patent No.: US 7,847,561 B2
(45) Date of Patent: Dec. 7, 2010

(54) NETWORK DEVICE, NETWORK CONNECTION DETECTOR AND DETECTION METHOD THEREOF

(75) Inventors: Liang-Wei Huang, Wanhua District (TW); Shieh-Hsing Kuo, Taipei (TW); Yao-Yi Tsai, Hsinchu (TW); Chi-Shun Weng, Anding Township, Tainan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 12/634,023

(22) Filed: Dec. 9, 2009

(65) Prior Publication Data

US 2010/0085062 A1    Apr. 8, 2010

Related U.S. Application Data

(63) Continuation of application No. 11/892,185, filed on Aug. 21, 2007, now Pat. No. 7,652,483.

(30) Foreign Application Priority Data

Oct. 27, 2006  (TW) ............................... 95139657 A

(51) Int. Cl.
*G01R 31/11*  (2006.01)

(52) U.S. Cl. .................. 324/534; 324/533; 370/465

(58) Field of Classification Search ................. 324/533, 324/534; 370/465
See application file for complete search history.

(56) References Cited

U.S. PATENT DOCUMENTS

| 5,677,633 | A |   | 10/1997 | Moser et al. |
| 5,754,552 | A | * | 5/1998  | Allmond et al. ............. 370/465 |
| 5,923,663 | A |   | 7/1999  | Bontemps et al. |
| 6,349,119 | B1 |  | 2/2002  | Sogabe et al. |
| 6,434,716 | B1 |  | 8/2002  | Johnson et al. |

FOREIGN PATENT DOCUMENTS

TW    200620886    6/2006

OTHER PUBLICATIONS

Chinese language office action dated Oct. 12, 2009.

* cited by examiner

*Primary Examiner*—Vincent Q Nguyen
(74) *Attorney, Agent, or Firm*—Thomas, Kayden, Horstemeyer & Risley, LLP

(57) ABSTRACT

A network device, a network connection detector and a detection method thereof are disclosed. The network device includes a socket, a waveform generator and a reflected wave detector. The waveform generator sends a first test wave to at least a first contact of a plurality of contacts of a socket and then the reflected wave detector detects a first reflected wave that is corresponding to the first test wave and is reflected from the first contact. Thus a first control signal is generated according to detection result of the first reflected wave.

7 Claims, 4 Drawing Sheets

NETWORK DEVICE, NETWORK CONNECTION DETECTOR AND DETECTION METHOD THEREOF

CROSS-REFERENCE TO RELATED APPLICATION

This is a continuation of U.S. application Ser. No. 11/892,185, filed on Aug. 21, 2007, now U.S. Pat. No. 7,652,483 the contents of which are incorporated hereby by reference.

BACKGROUND OF THE INVENTION

The present invention relates network communications, especially to a network device, a network connection detector and a detection method thereof.

Due to fast development of computer technology, there is a trend for higher processing speed with lower power consumption. Especially for notebooks, less power consumption ensures longer use time. Generally, when the network devices that conform to IEEE802.3 standard, such as network cards, hubs, switches, and routers, connect with each other, information is exchanged by issuance of a link pulse. Then a suitable communication protocol is chosen to transmit information.

Referring to FIG. 1, a typical network system includes a first network device 10 and a second network device 20. The first network device 10 comprises a first control unit 12, a first transmitter 14, and a first receiver 16, and the second network device 20 comprises a second control unit 22, a second transmitter 24, and a second receiver 26. The first control unit 12 is used to control the first transmitter 14 and the first receiver 16 while the second control unit 22 is for control of the second transmitter 24 and the second receiver 26, so that information is sent from the first transmitter 14, through the local area network (LAN) or Internet, and then received by the second receiver 26. Alternatively the information is sent from the second transmitter 24, through the local area network (LAN) or Internet, and then received by the first receiver 16.

When the network connection between two corresponding network devices has not been established, the link pulse is repetitively transmitted from a first network device, while a second network device needs to constantly monitor reception of such link pulse. According to IEEE802.3 standard, the link pulse should be transmitted every 16 ms until the link pulse is received and the connection is established. Even under the condition that one of the network devices is powered off or the network cables are not connected, the link pulse is still constantly transmitted and monitored. Therefore, a lot of power is so consumed by the network devices.

There are three modes in terms of Ethernet connection speed: 10 Mbps, 100 Mbps, 1000 Mbps. The 1000M mode requires four pairs of wiring (i.e., 8 wires) for transmission while 10M/100M mode only need two pairs of wiring. Before establishing connection between two corresponding network devices, only two pairs of network wiring are used for transmission and the mode is selected by auto negotiation procedure. However, since there is no 1000M mode for network connection in early days, only network cables with two pairs of wiring are installed when building up infrastructure in home or office environment. When both of the corresponding network devices support 1000M mode, the auto negotiation procedure usually prefers the 1000M mode as a prioritized mode. However, due to the inferiority of the actual infrastructure installment (i.e., with only two pairs of wiring), which does not support network connection under 1000M mode, the issuing and monitoring of link pulses for 1000M mode will be repeated without resulting in any successful connection. Only after repeating the issuing and monitoring of the link pulse for a preset number of times or a predetermined period of time and the connection is still not established, will the network device then select modes with lower speed such as the 100M mode. Such repetitive issuing and monitoring of link pulses causes waste of time and unnecessary power consumption.

Thus there is a need to provide a novel network connection detector and a detection method thereof, which improves the shortcoming of undue power consumption caused by continuous issuing/monitoring of link pulses, and thereby saves time to establish network connection and improves quality of network connection.

SUMMARY OF THE INVENTION

Therefore it is an object of the present invention to provide a network device, network connection detector, and a detection method thereof, which, when testing network connection, send a test wave and receive a reflected test wave, and according to detection result of the reflected test wave, determine whether the wiring between two corresponding network devices are connected or not. Thus there is no need to repeatedly transmit the link pulses, which causes unnecessary power consumption.

It is another object of the present invention to provide a network device, network connection detector, and a detection method thereof, which send a test wave whose energy is smaller than the energy of the link pulse while establishing network connection, so as to save power.

The network device and network connection detector according to the present invention include a socket, a waveform generator and a reflected wave detector. The detection method is to send a first test wave to at least a first contact of a plurality of contacts of a socket. Then the reflected wave detector detects a first reflected wave that corresponds to the first test wave and is reflected from the first contact. Thus a first control signal is generated according to detection result of the first reflected wave. The first control signal indicates whether a physical connection is formed between the socket and the plug.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

A network connection detector according to the present invention is applied in network devices, which support, for example, 10M/100 Mbps Fast Ethernet and/or 10M/100M/1000M Gigabit Ethernet standard. It may also be applied to other type of network systems. According to detecting result of the detector, the network device according to embodiments of the present invention operates under two modes. The network connection detector detects the status of physical connection of the network device, such as whether network cables are connected or whether there is any damage of the network cable that leads to failure of connection. When the result of detection indicates that there is no connection, the network device switches to operate under a power-saving mode. That means except for components necessary for execution of detection, other circuit components are powered down for saving power, especially those related to link pulse transmitting/receiving, or in other words link pulse issuing/monitoring. When the detection result indicates that there is indeed physical connection formed, the network device works under a normal mode, wherein link pulses are constantly transmitted and received, in an attempt to establish connection with a remote-end network device.

Figure 1:
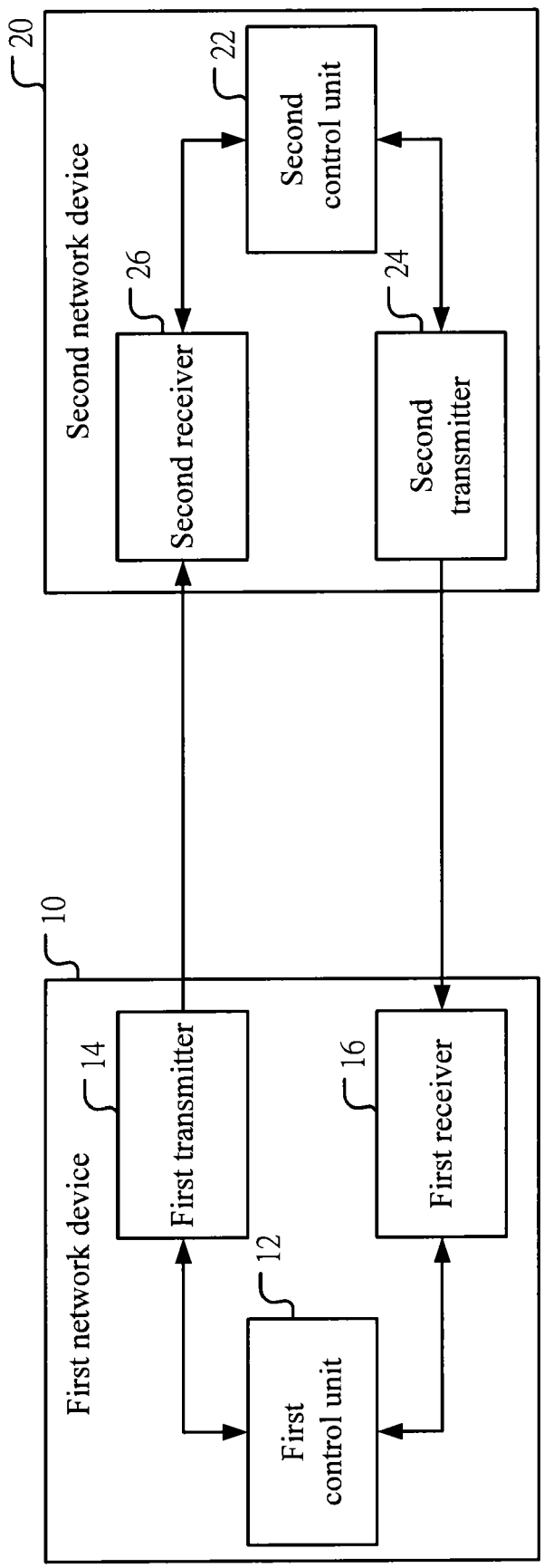
FIG. 1 is a block diagram showing connection between two corresponding network devices connected by conventional technology.
Figure 2:
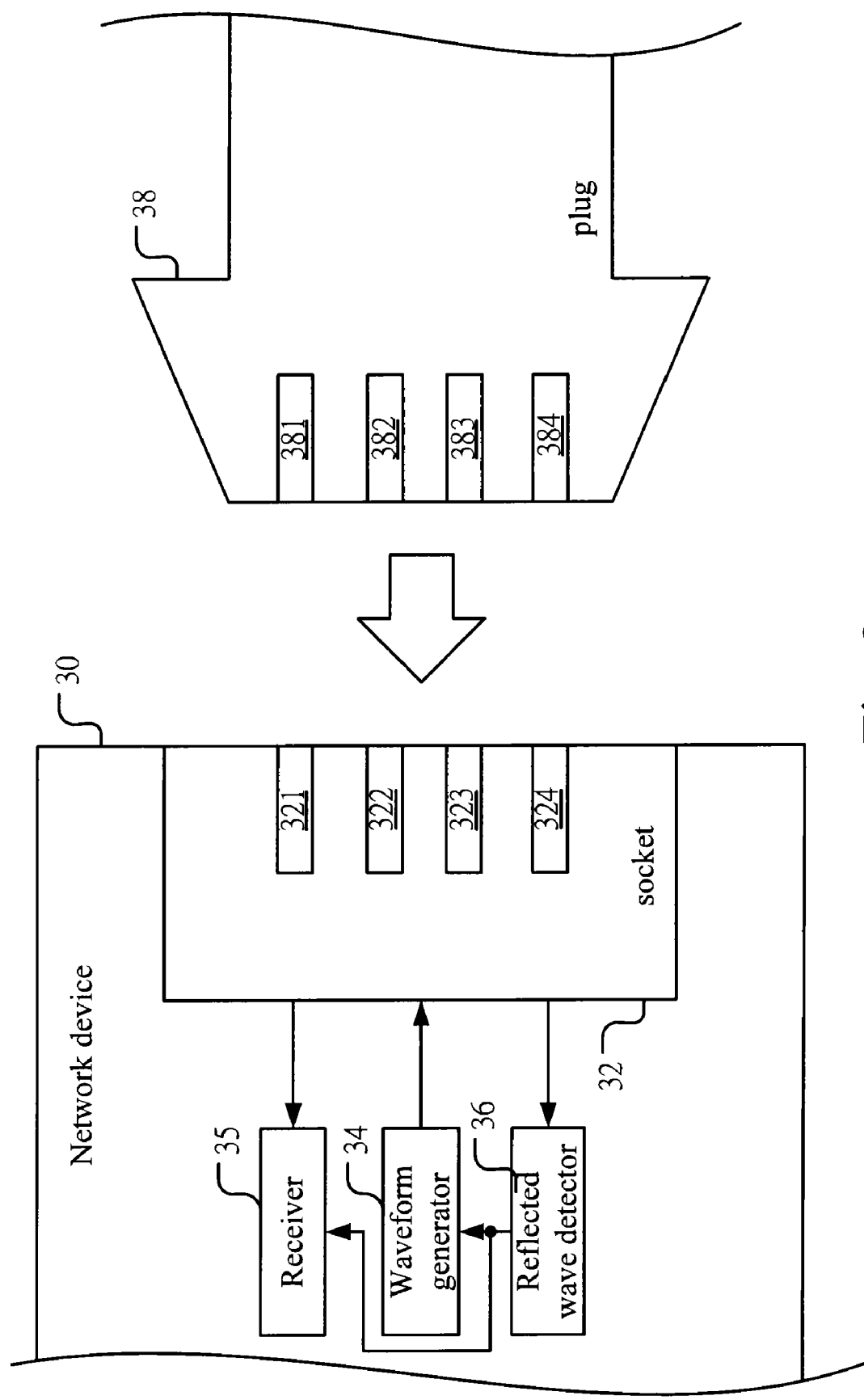
FIG. 2 is a flow chart of an embodiment according to the present invention.

Referring to FIG. 2, a network device 30 according to an embodiment of the present invention includes a socket 32 for receiving a compatible plug 38. In this embodiment, the socket 32 and the plug 38 are RJ45 type connectors, connectors similar to or derived from RJ45 standard (such as 8P8C connector), or connectors conforming to other specifications. Generally, the socket 32 comprises a plurality of contacts 321-324, respectively in contact with a plurality of contacts 381-384 of the plug 38 when plugged in. When the network device 30 is setting up connection with other network devices, a prerequisite is that a physical connection between the socket 32 of the network device 30 and the plug 38 of the network cable is formed. Taking advantage of this observation, in this invention part of the functions of the network device 30, such as transmitting/receiving of the link pulses, is disabled before the physical connection is set up between the network devices, and power consumption is significantly reduced as a result.

In order to achieve the above-mentioned objective, the network device 30 further includes a waveform generator 34 and a reflected wave detector 36. In this embodiment, the waveform generator 34 is used to both generate link pulses conforming to IEEE802.3 standard under the normal mode, and generate a test wave to one or more of the contacts under the power-saving mode, which serve to test whether the above-mentioned physical connection is formed. The waveform generator 34 can be realized as a digital to analog converter (DAC) that generates the waves needed according to digital values. In order to satisfy the specific waveform requirement of the link pulse, the waveform generator 34 further comprises more complicated functions such as wave shaping. As for the reflected wave detector 36, it is used to, under the power-saving mode, receive and detect reflected the test wave transmitted from the waveform generator 34 to the above-mentioned one or more of the contacts. According to detection result, the network device 30 determines whether to remain in power-saving mode or to switch to the normal mode for establishing connection.

According to IEEE802.3 standard, the link pulse is a signal with certain waveform characteristics and a peak-to-peak swing of 4V, repetitively transmitted at 16 ms cycle. The pulse signal transmitted in such high frequency heavily burdens the power consumption of the network device 30. Before formation of physical connection between the network devices, such kind of consumption proves to be without merit. Thus under the power-saving mode of the present invention, the test wave with smaller amplitude such as 500 mV, simpler waveform, and longer transmission period such as 1 s is used, which can reduce power consumption. In this embodiment, the reflected wave detector 36 is a power detector that detects reflected power of the above test wave. When there is no physical connection between the network devices 30, total reflection or near-total reflection occurs. Thus the present invention detects whether the reflected power is over a threshold. When there is no physical connection and total reflection occurs, the reflected power passes over the threshold and the network device 30 stays in the power-saving mode. Only when the physical connection is formed and the reflected power is accordingly smaller than the threshold, will the present invention switch to the normal mode for trying to establish connection.

It is to be noted that the present invention can also be used to detect whether a remote network device is turned off. However, here since the reflected test wave received by the reflected wave detector 36 will not be a total reflected version of the test wave transmitted from the waveform generator 34, the energy, and consequently swing, of the test wave from the waveform generator 34 needs to be increased so as to avoid misjudgment by the reflected wave detector 36 due to energy absorption by the remote network device of the test wave.

Under the power-saving mode, the waveform generator 34 is controlled to only exhibit limited function (for example, by turning off the wave shaping function), and a receiver 35 for receiving and therefore monitoring the link pulse from the remote end is also turned off. Only a small portion of the circuitry remains functioning, and therefore effectuates reducing power consumption.

Figure 3:
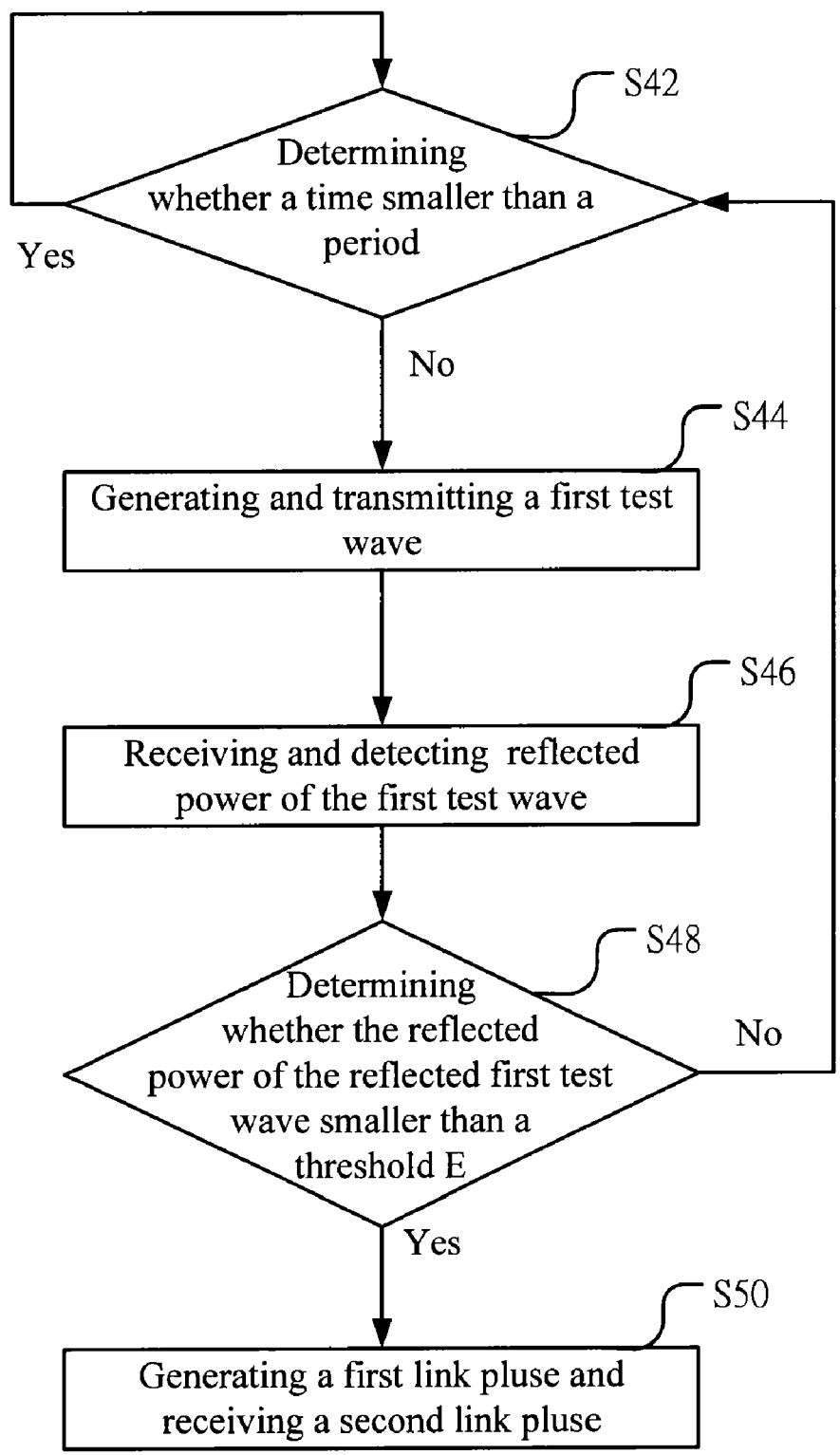
FIG. 3 is a flow chart of another embodiment according to the present invention.

Referring to FIG. 3, a flow chart of detecting network connection according to an embodiment of the present invention is disclosed. When the network device 30 attempts to connect with another network device, part of its functions such as transmitting/receiving the link pulse is disabled before the physical connection can be established, so as to reduce power consumption effectively. At this time, the waveform generator 34 transmits a first test wave to at least one first contact of a plurality of contacts 321-324 at certain period T such as 1 s (step S42 and step S44). Please note that, under the power saving mode, the test wave transmitted has smaller amplitude (e.g., 500 mV), simpler waveform, and longer transmitting period (e.g., 1 s).

Under the power saving mode, the reflected wave detector 36 receives and detects the reflected first test wave from one or plurality of the contacts 381-384 (step S46). In this embodiment, the reflected wave detector 36 is a power detector that detects reflected power of the first test wave. Based on the phenomenon that total reflection or near-total reflection occurs when the physical connection has not been formed, it is checked whether the reflected power is over a threshold E (step S48). When total reflection occurs, the reflected power is over the threshold E and the power saving mode remains. Only after the physical connection is formed and the reflected power accordingly falls under the threshold, will the network device switch to the normal mode. According to detection result of the reflected first test wave, the reflected wave detector 36 generates a first control signal that is sent to the waveform generator 34. The first control signal indicates a first mode and a second mode. According to the first control signal, the waveform generator 34 sends a first test wave under the first mode and sends a first link pulse under the second mode. Under the first mode, the reflected power is over the threshold. Under the second mode, the reflected power is smaller than the threshold and the first link pulse is sent to a remote network device; meanwhile, the receiver 35 is enabled to receive a second link pulse from the remote network device, for establishing connection (step S50).

Figure 4:
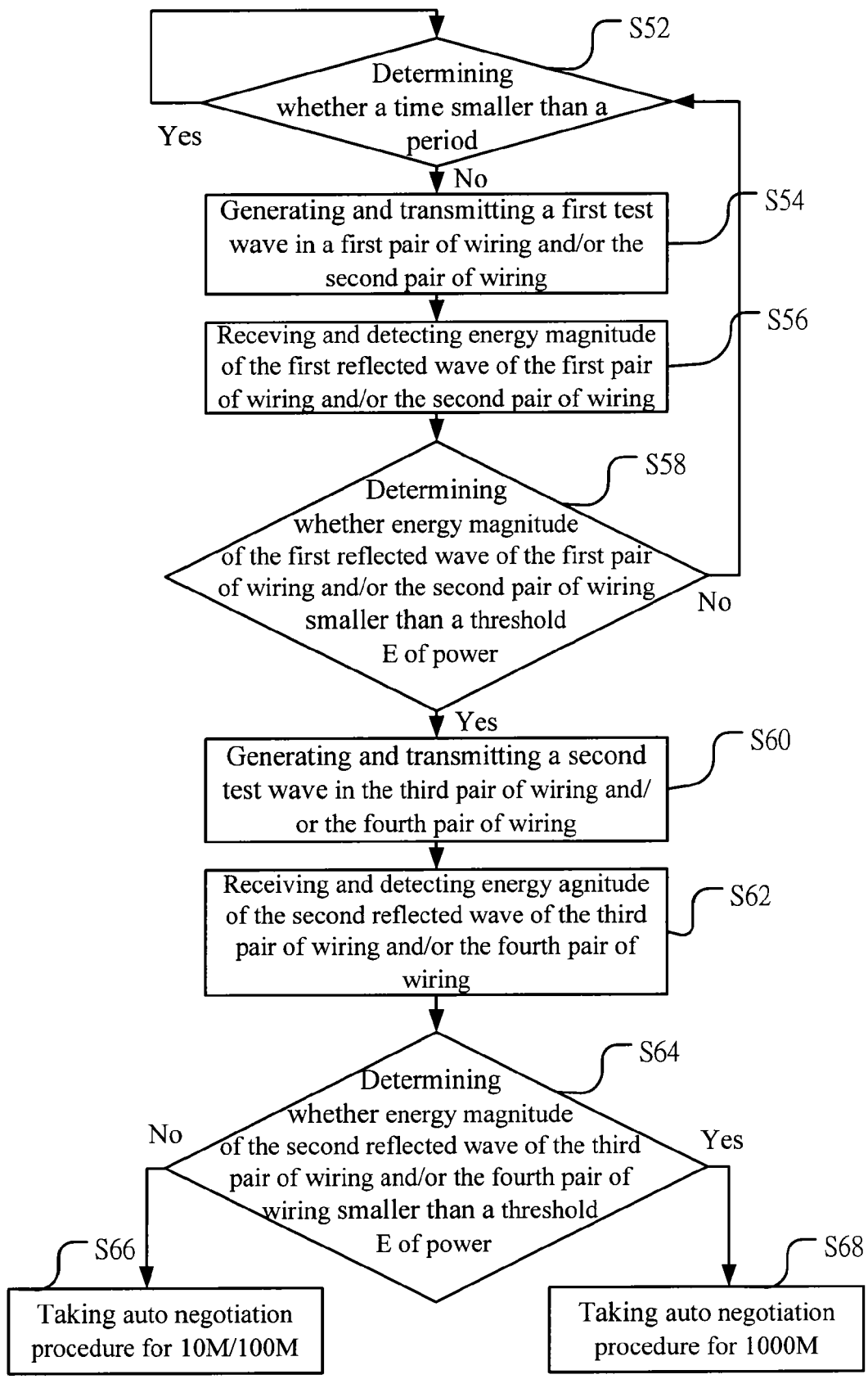
FIG. 4 is a flow chart of a further embodiment according to the present invention.

Now please refer to FIG. 4, which shows a flow chart of detecting connection by the network connection detector, applied in a 10M/100M/1000M Gigabit Ethernet network device. In this embodiment, in addition to detecting whether physical connection is formed, the network device 30 can also detect whether the physical connection formed (for example, the cable adopted) can support the 1000 Mbps network communication. The network device 30 according to this embodiment of the present invention checks such support of gigabit connectivity based on the fact that some network cables only include two pairs of wiring (therefore, only two pairs of contacts) for supporting the 10M/100 Mmbps networking, while other network cables include four pairs of wiring, which is supportive of 1000 Mbps networking.

In the beginning, the waveform generator 34 of the network device 30 generates test waves at certain period T and sends a first test wave to a first pair of wiring or a second pair of wiring, or both (step S52 and step S54). Then the reflected wave detector 36 receives and detects energy magnitude of a first reflected wave of the first pair of wiring or the second pair of wiring, or both (step S56). When the energy of the first reflected wave is no less than the threshold E of power (step S58), it means that there is no physical connection between the two network devices, and at this time the network device initiates to transmit the first test wave again every time a period of time lapses; when the energy of the first reflected wave is smaller than the threshold E of power (step S58), it means that the physical connection is formed between the two network devices, and at this time the network device further detects whether the physical connection being formed supports 1000 Mbps communication (step S58). For 1000 Mbps connectivity check, a second test wave is sent from a second contact among the plurality of contacts 321-324 to a third pair of wiring or a fourth pair of wiring, or both, and similar detection as with the first test wave is then performed (step S60 and step S62). A second control signal is generated according to detection result of the second reflected wave, where the second control signal indicates a transmission rate supported by the physical connection between the socket 32 and the plug 38. When the second reflected wave received by the network device 30 is no less than the threshold E of power (step S64), it means that the physical connection formed does not include the other two pairs of wiring, which otherwise facilitate the network connection of 1000 Mbps, and accordingly auto-negotiation procedure for 10M/100 Mbps is proceeded (step S66). When the second reflected wave is smaller than the threshold E of the power (step S64), it means that the physical connection formed includes the other two pairs of wiring, or in total four pairs of wiring, facilitating the network connection of 1000 Mbps, and accordingly the auto negotiation procedure for 1000 Mbps is proceeded (step S68).

It is to be noted that although the communication with a remote network device through the four pairs of wiring as mentioned above is facilitated by the plurality of contacts 321-324 of the socket 32 in FIG. 2 respectively contacting with the plurality of contacts 381-384 of the plug 38, a person of ordinary skill in the pertinent art would appreciate that the number of contacts in the socket 32 as well as in the plug 38 as shown in FIG. 2 serves only as an example of the present invention. In practice, various plugs and sockets with a different number of contacts may be used.

Furthermore, although in the above embodiment the network device 30 uses a single circuit component (i.e., the waveform generator 34) to generate the test wave and the link pulse respectively under various modes, a person of ordinary in the pertinent art would appreciate that the test wave and the link pulse can be generated by two separate circuit components. In addition, although there is only a set of the reflected wave detector 36 in the above embodiment, this is not meant to be a limitation of the invention; in fact, each of the contacts can correspond to one reflected wave detector 36.

In summary, a network device, a network connection detector, and a detection method according to the present invention disclose sending a first test wave from the waveform generator, through at least a first contact of a plurality of contacts of a socket, to a remote-end network device. Then the reflected wave detector detects a first reflected wave that corresponds to the first test wave and is reflected from the first contact. A first control signal is generated according to the detection result of the first reflected wave. By the first control signal, it is checked that whether the socket forms physical connection with the plug.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A network device comprising:
   a socket comprising a plurality of contacts;
   a waveform generator coupled to the socket, sending a low-power test wave to at least one contact of the plurality of contacts in a first mode, and sending a link pulse to at least one contact of the plurality of contacts in a second mode; and
   a reflected wave detector coupled to the socket, detecting a reflected wave that corresponds to the low-power test wave and generating a first control signal to remain the network device in the first mode or to switch to the second mode according to a detection result of the reflected wave;
   wherein the low-power test wave has a lower amplitude than the link pulse.

2. The network device as claimed in claim 1, wherein the first control signal indicates whether a physical connection is formed between the socket and a plug.

3. The network device as claimed in claim 1, wherein the reflected wave detector is a power detector, generating the first control signal according to a power level of the reflected wave.

4. The network device as claimed in claim 1, wherein the waveform generator sends another low-power test wave after a period of time during which the network device operates in the first mode.

5. The network device as claimed in claim 1, wherein the waveform generator is a digital to analog converter.

6. The network device as claimed in claim 1, wherein the link pulse is a signal with a peak-to-peak swing of 4V and repetitively transmitted at 16 ms cycle.

7. The network device as claimed in claim 6, wherein the low-power test wave is a signal with 500 mV amplitude and 1 s transmission period.

* * * * *